United States Patent
Lal et al.

(10) Patent No.: US 12,338,389 B2
(45) Date of Patent: Jun. 24, 2025

(54) PROCESS FOR PREPARING NON-CEMENTITIOUS LOSS CONTROL COMPOSITION

(71) Applicant: OIL AND NATURAL GAS CORPORATION LIMITED, New Delhi (IN)

(72) Inventors: Kishori Lal, Dehradun (IN); Abhinav Hazra, Dehradun (IN); Deepak Painuly, Dehradun (IN); Parvinder Singh, Dehradun (IN)

(73) Assignee: OIL AND NATURAL GAS CORPORATION LIMITED, New Delhi (IN)

( * ) Notice: Subject to any disclaimer, the term of this patent is extended or adjusted under 35 U.S.C. 154(b) by 0 days.

(21) Appl. No.: 18/687,898

(22) PCT Filed: Jan. 27, 2022

(86) PCT No.: PCT/IN2022/050062
§ 371 (c)(1),
(2) Date: Feb. 29, 2024

(87) PCT Pub. No.: WO2023/031947
PCT Pub. Date: Mar. 9, 2023

(65) Prior Publication Data
US 2024/0352304 A1    Oct. 24, 2024

(30) Foreign Application Priority Data
Sep. 1, 2021   (IN) .............................. 202111039586

(51) Int. Cl.
*C04B 40/00*   (2006.01)
*C09K 8/504*   (2006.01)
(Continued)

(52) U.S. Cl.
CPC ........ *C09K 8/5045* (2013.01); *C04B 40/0046* (2013.01); *C09K 8/514* (2013.01); *C04B 2111/0012* (2013.01); *C09K 2208/18* (2013.01)

(58) Field of Classification Search
None
See application file for complete search history.

(56) References Cited

U.S. PATENT DOCUMENTS

| 4,836,940 A | 6/1989 | Alexander |
| 2009/0008095 A1* | 1/2009 | Duncum ................ C09K 8/502 166/276 |

(Continued)

FOREIGN PATENT DOCUMENTS

WO    2020209831 A1   10/2020

OTHER PUBLICATIONS

Silva, R. p., et al. "Rheological study of the effect of calcium surface-modified bentonite on an oil-based drilling fluid." WIT Transactions on Ecology and the Environment, vol. 186 (2014), pp. 595-600.

(Continued)

*Primary Examiner* — Andrew Sue-Ako
(74) *Attorney, Agent, or Firm* — SLEMAN & LUND LLP

(57) ABSTRACT

A non-cementitious loss control composition and a method for preparing a non-cementitious loss control composition is provided. The method comprises adding bentonite to water to form a gel slurry and adding a cross linking agent to the gel slurry. The method further comprises adding a binding agent to the gel slurry and the cross linking agent and adding a strengthening agent to the binding agent, the gel slurry and the cross-linking agent. Further, the method comprises adding a bridging agent to the strengthening agent, the binding agent, the gel slurry and the cross linking agent. The method (Continued)

further comprises adding a retarder to the bridging agent, the strengthening agent, the binding agent, the gel slurry and the cross linking agent, where the loss control composition is a lightweight thixotropic composition that is prepared in a density range of 10 Pounds Per Gallon (ppg) to 16 ppg.

16 Claims, 11 Drawing Sheets

(51) Int. Cl.
*C09K 8/514* (2006.01)
*C04B 111/00* (2006.01)

(56) References Cited

U.S. PATENT DOCUMENTS

2012/0325477 A1    12/2012  Brenneis
2022/0363972 A1*   11/2022  Jones .................... E21B 33/14

OTHER PUBLICATIONS

Alsabagh et al., "Investigation of some locally water-soluble natural polymers as circulation loss control agents during oil fields drilling", Egyptian Journal of Petroleum (2014) 27-34.
Eric B, Joel F, Grace O (2016) Oil Well Cement Additives: A Review of the Common Types. Oil Gas Research.

* cited by examiner

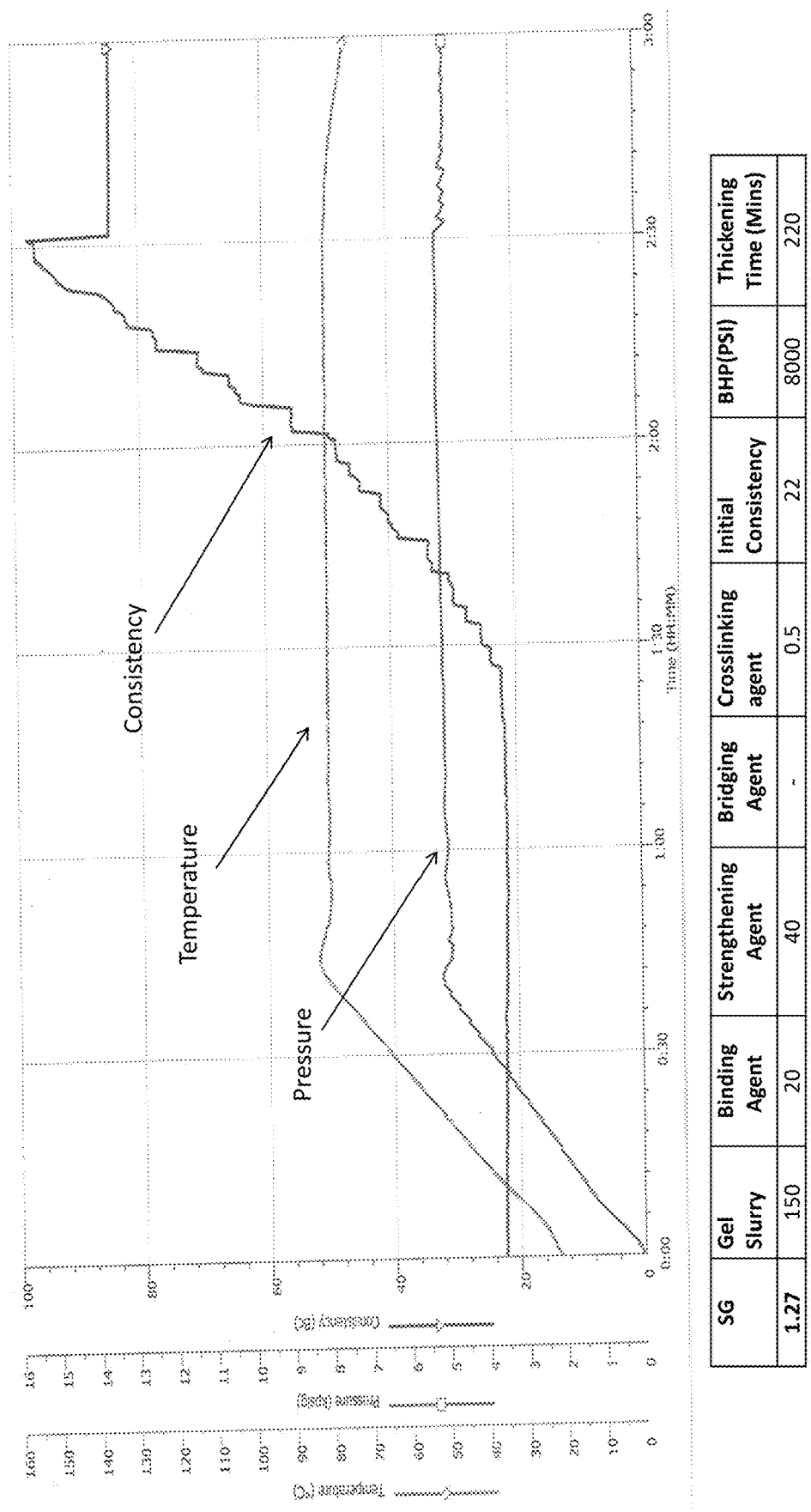
FIG. 2 BHCT-80°C, BHP-5000PSI & RT-40mins
| SG | Gel Slurry | Binding Agent | Strengthening Agent | Bridging Agent | Crosslinking agent | Initial Consistency | BHP(PSI) | Thickening Time (Mins) |
|---|---|---|---|---|---|---|---|---|
| 1.27 | 150 | 20 | 40 | - | 0.5 | 22 | 8000 | 220 |

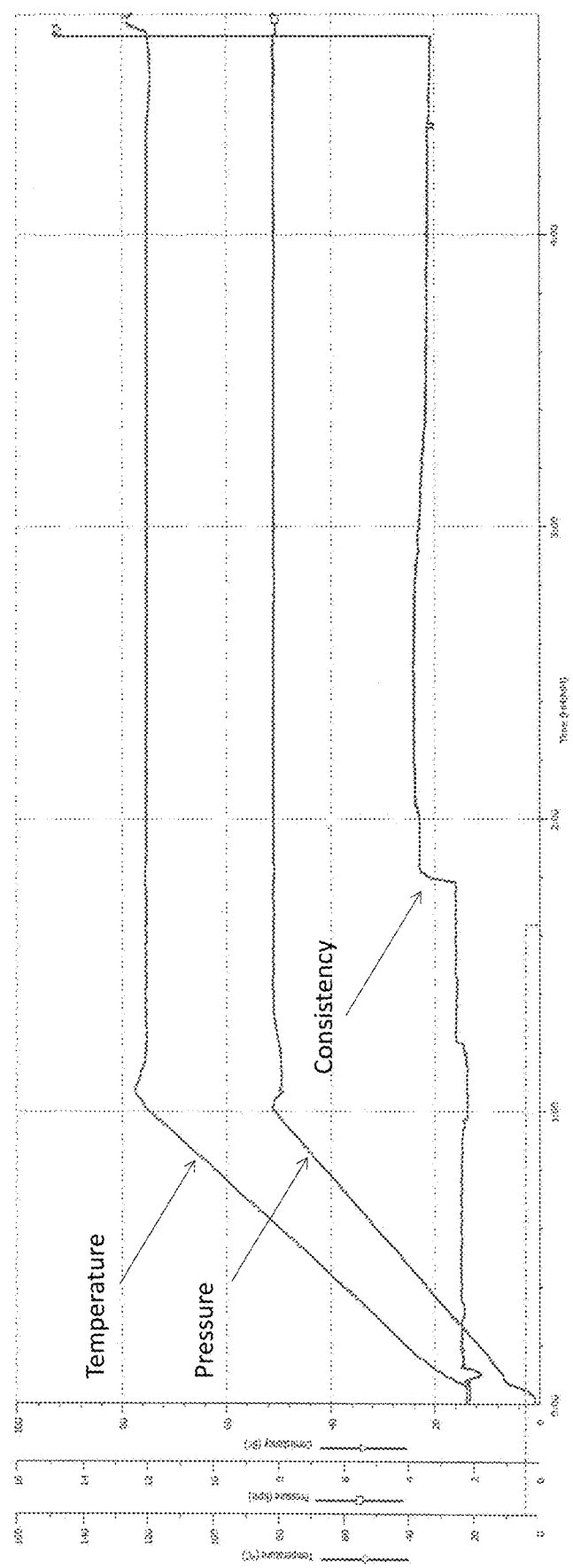
Fig 3: BHCT-120°C, BHP-8000PSI & RT-60mins
| SG | Gel Slurry | Binding Agent | Strengthening Agent | Crosslinking agent | Retarder | Initial Consistency | BHP(PSI) | Thickening Time (Mins) |
|---|---|---|---|---|---|---|---|---|
| 1.23 | 150 | 20 | 40 | 0.5 | 10 | 14 | 8000 | 278 |

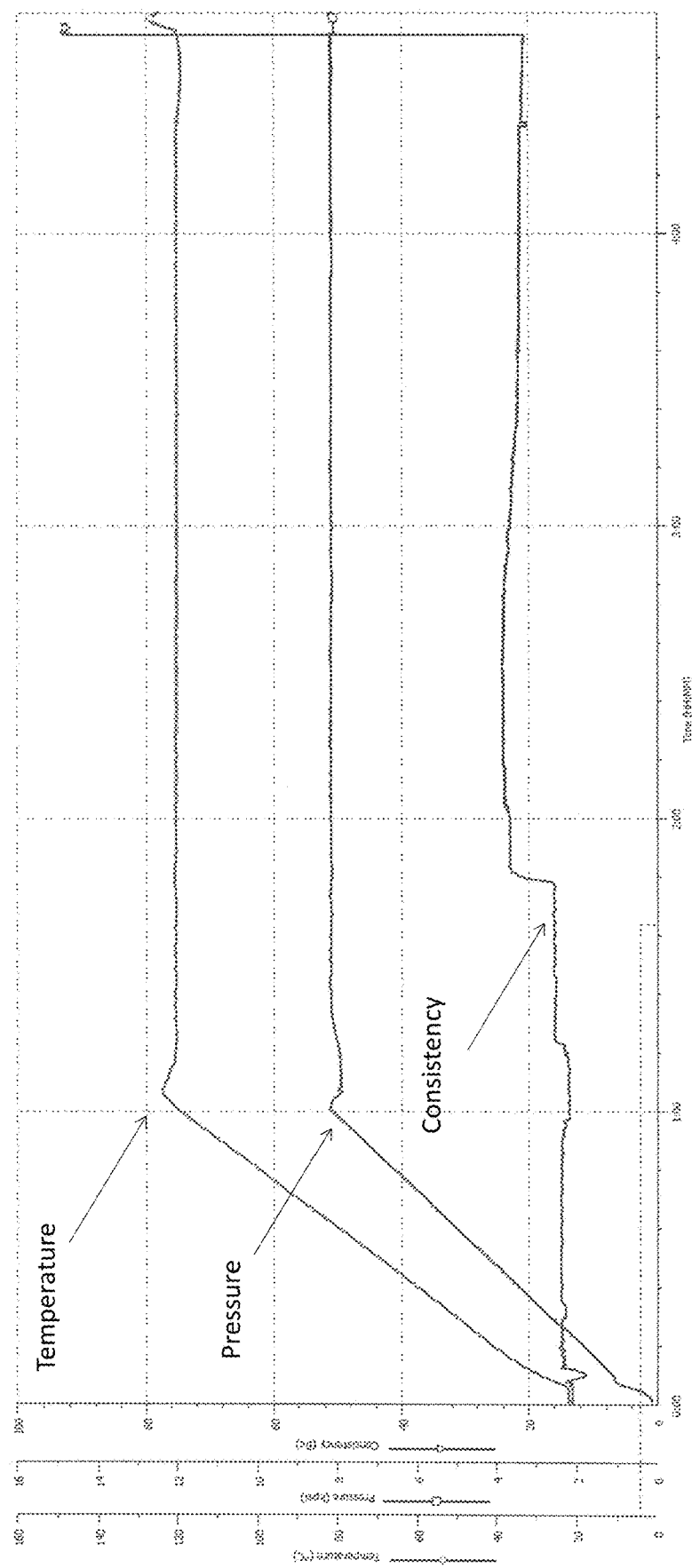
Fig 4: BHCT-150°C, BHP-10000PSI & RT-60mins

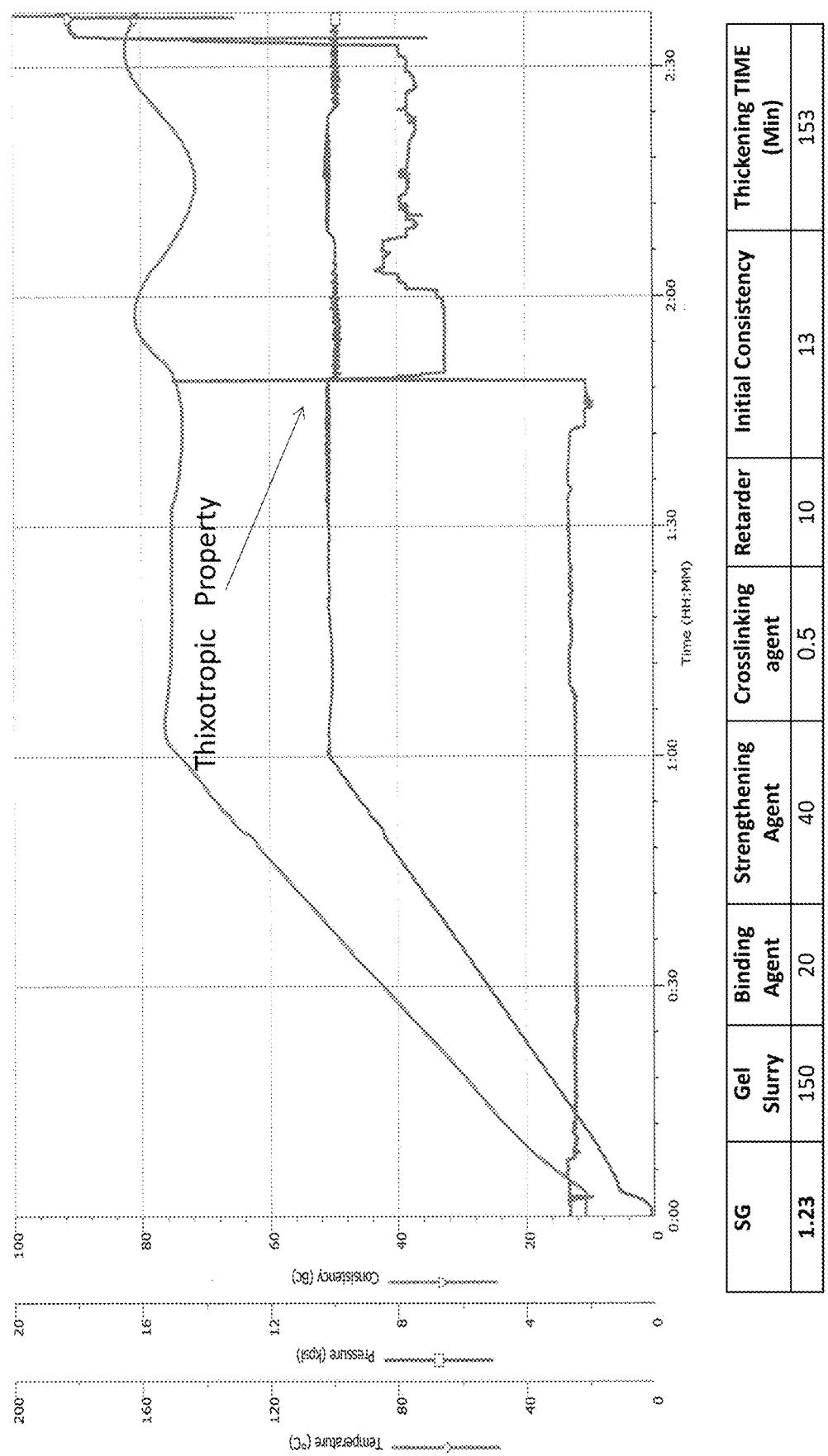
Fig 5: BHCT-150°C, BHP-10000PSI & RT-60mins

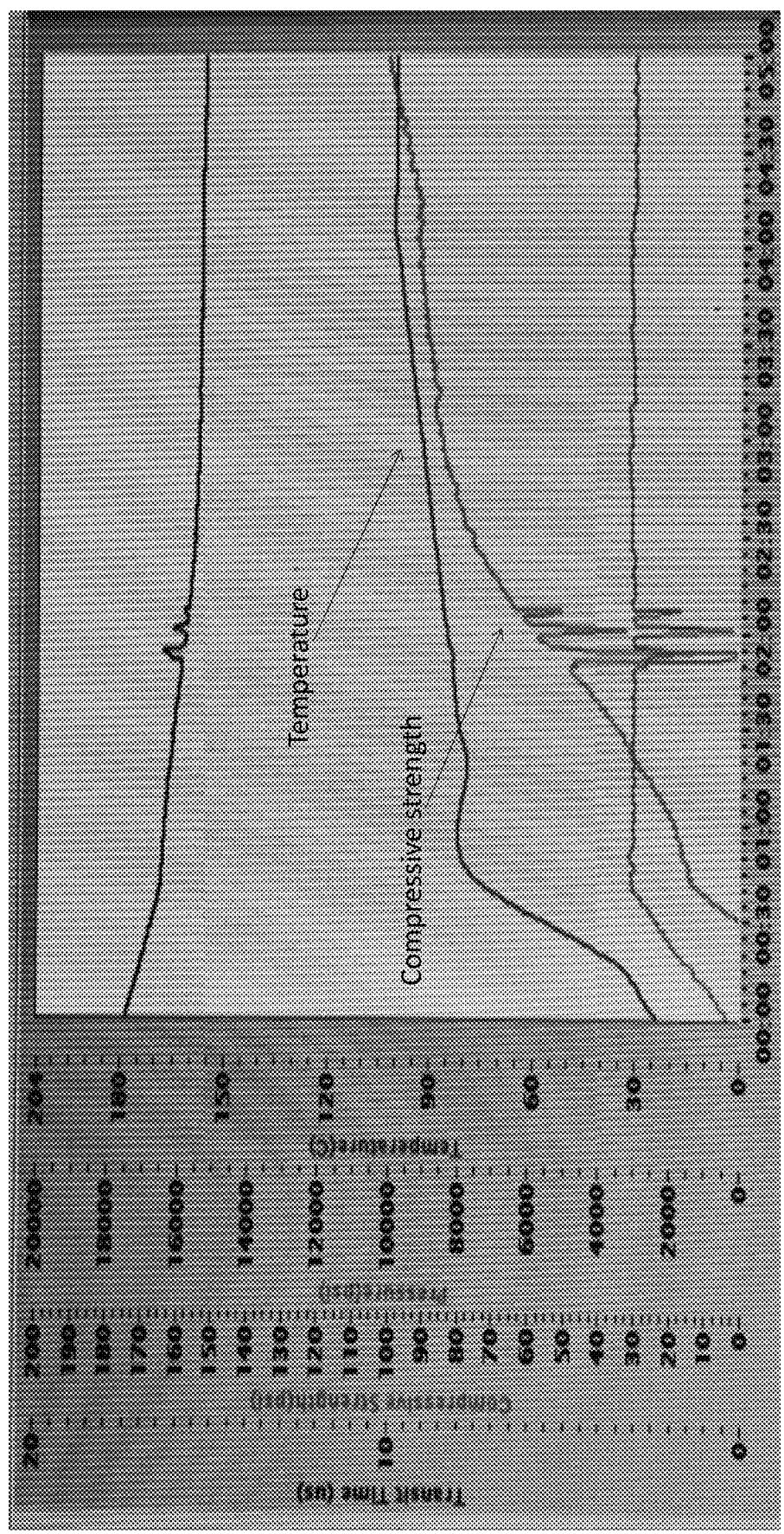
FIG. 6: Compressive strength at 100PSI in 5hrs & 50PSI in 2hrs at BHST 100°C raised in 4hrs

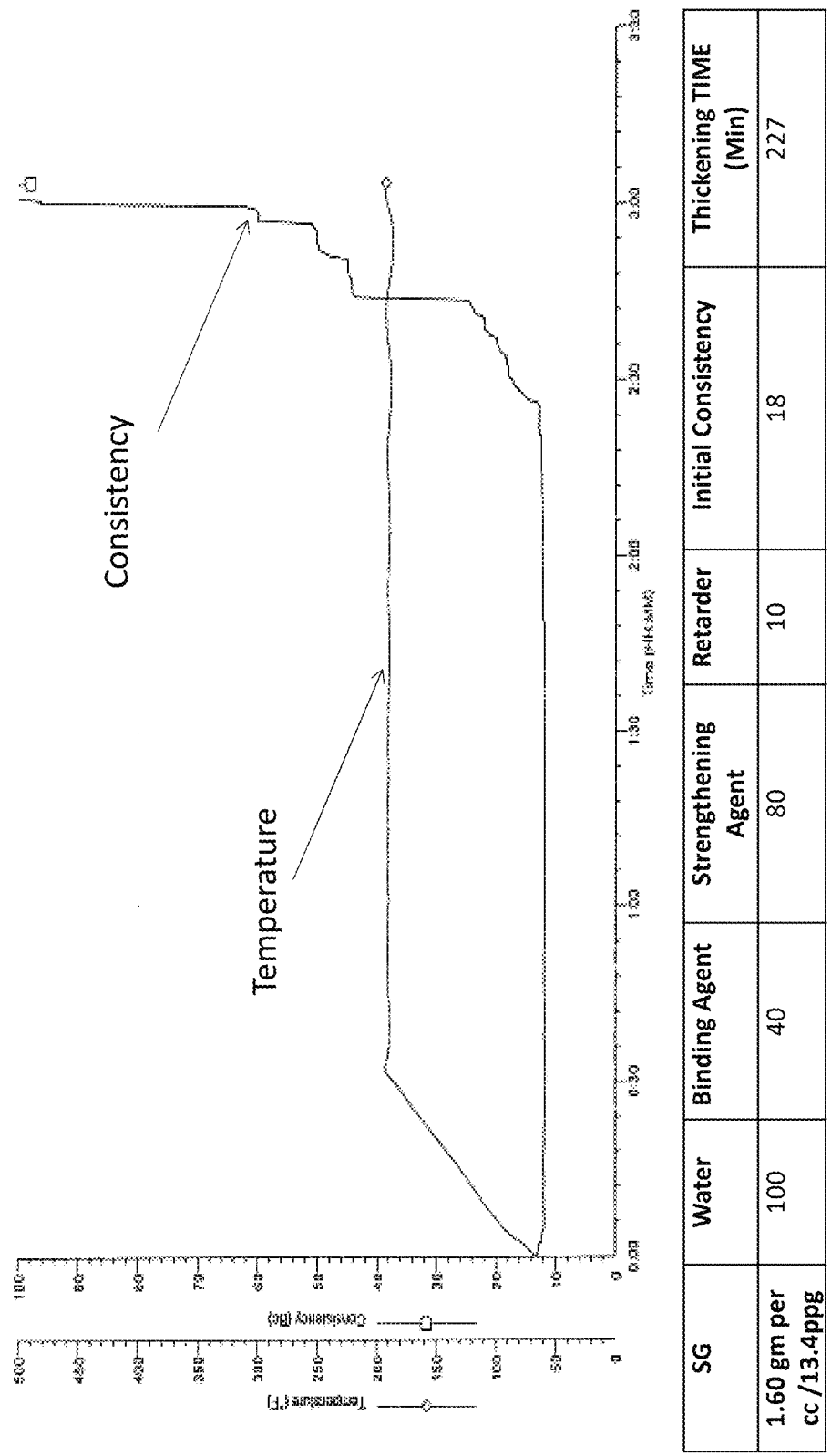
Fig 7: BHCT—90°C, BHP-5000PSI & RT-30mins

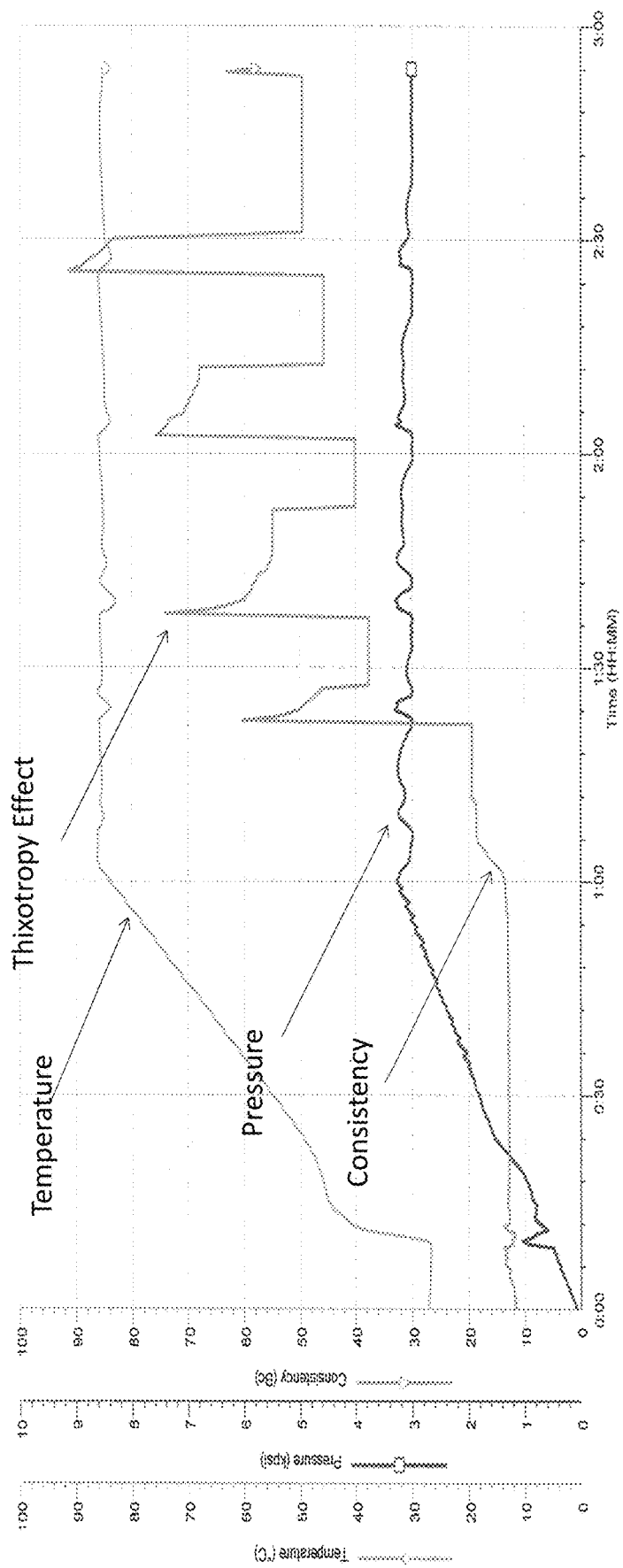
Fig 8: Hesitation squeeze at BHCT-85°C, BHP-3000PSI & RT-60mins

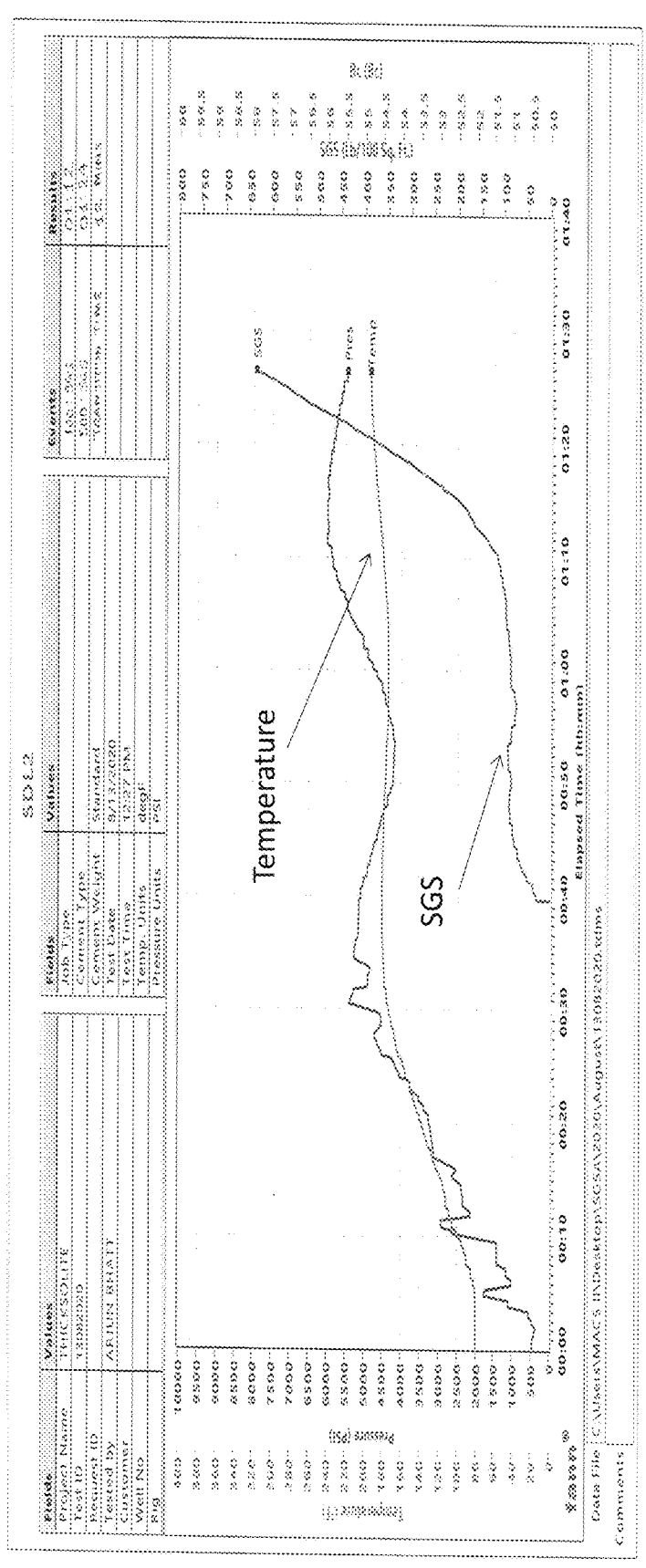
Fig 10: SGSA build up from 100SGS to 500SGS in 12 minutes, reflecting rapid build up of static gel strength, BHCT-85°C & BHP- 5000PSI
| SG/PPG | Gel slurry | Binding Agent | Strengthening Agent | Bridging Agent | Crosslinking agent | Initial Consistency Bc |
|---|---|---|---|---|---|---|
| 1.33 / 11.1 | 125 | 20 | 40 | 07 | 0.5 | 22 |

PROCESS FOR PREPARING NON-CEMENTITIOUS LOSS CONTROL COMPOSITION

FIELD OF THE INVENTION

The present invention relates generally to a process of preparing a loss control composition. More particularly, the present invention relates to an improved non-cementitious loss control composition and a process for preparing the non-cementitious loss control composition for oil wells.

BACKGROUND

Mud losses while drilling is a serious problem in onshore and offshore oil fields that adversely affect drilling time and well productivity and increases drilling cost. The oil fields are multilayered reservoirs comprising of fractured carbonate that is highly porous having various dimensions of porosity i.e. micro, meso and macro. Further, intensity of drilling fluid invasion in the oil field is very high due to pattern and lithological characteristic of the oil well that is cavernous, vugular or fractured formation. Typically, in the event lost-circulation zones are anticipated, preventive measures are taken by treating the mud with cementitious lost-circulation materials (LCMs). However, in the reservoir section of the oil well, the cementitious loss control material chokes the reservoir section and it becomes difficult to take out oil/gas from the reservoir.

Conventionally, in older oil fields, differential pressure depletion and loss circulation takes place during drilling that becomes more severe with increased directional drilling activity and reservoir depletion. Further, pressure in some of the sub-hydrostatic reservoir layers are as low as 5 pounds per gallon (PPG) mud weight equivalent (MWE) or less. Sub hydrostatic pressure and mud loss problem due to lithological characteristics in the oil well causes wellbore instability, differential stuck ups and sometimes blow out condition. Further, it has also been observed that chances of mud loss is relatively high especially in slim-hole in the oil well where lifting of cutting inside the well is not proper. Further, there are also number of wellbore instability incidents like stuck-pipe, tight hole and cavings that occurs at shale intervals inside the oil fields especially when there is a drop in hydrostatic head of wellbore annulus due to mud losses in carbonate reservoirs. This problem further escalates with depletion of reservoir pressures as well as increased directional drilling activity.

In light of the above-mentioned drawbacks, there is a need for an improved loss control composition and method of preparing the loss control composition. Further, there is a need to provide a cost effective environment friendly and non-damaging loss control composition for drilling loss prone depleted reservoir having fractured, cavernous and vuggy carbonate formation.

SUMMARY OF THE INVENTION

In various embodiments of the present invention, a method for preparing a non-cementitious loss control composition is provided. The method comprises adding bentonite to water to form a gel slurry and adding a cross linking agent to the gel slurry. Further, the method comprises adding a binding agent to the gel slurry and the cross linking agent and adding a strengthening agent to the binding agent the gel slurry and the cross linking agent. The method further comprises adding a bridging agent to the strengthening agent, the binding agent, the gel slurry and the cross linking agent and adding a retarder to the bridging agent, the strengthening agent, the binding agent to the gel slurry and the cross linking agent. Further, the loss control composition is a lightweight thixotropic composition that is prepared in a density range of 10 Pounds Per Gallon (ppg) to 16 ppg.

In various embodiments of the present invention, a loss control composition is provided. The loss control composition comprises a gel slurry comprising of bentonite and water. Further, the loss control composition comprises cross linking agent, binding agent, a strengthening agent, a bridging agent and a retarder. Further, the loss control composition is a lightweight thixotropic composition that is prepared in the range of 10 Pounds per gallon (ppg) to 16 ppg.

BRIEF DESCRIPTION OF THE ACCOMPANYING DRAWINGS

The present invention is described by way of embodiments illustrated in the accompanying drawings wherein:

FIG. 2 is a graph illustrating thickening time of the loss circulation composition, in accordance with an embodiment of the present invention;

FIG. 3 illustrates thickening time graph of the loss control composition, in accordance with an embodiment of the present invention;

FIG. 4 illustrates thickening time graph of the loss control composition, in accordance with an embodiment of the present invention;

FIG. 5 is a graph illustrating thixotropic properties of the loss control composition, in accordance with an embodiment of the present invention;

FIG. 6 is a graph illustrating compressive strength of the loss control composition, in accordance with an embodiment of the present invention;

FIG. 7 illustrates thickening time graph of the loss control composition, in accordance with an embodiment of the present invention;

FIG. 8 is a graph illustrating hesitation squeeze, in accordance with an embodiment of the present invention;

FIG. 10 is a graph illustrating static gel strength build up, in accordance with an embodiment of the present invention.

DETAILED DESCRIPTION OF THE INVENTION

The compositions, formulations and methods discussed herein are merely illustrative of specific manners in which to make and use this invention and are not to be interpreted as limiting in scope. While the compositions and methods have been described with a certain degree of particularity, it is to be noted that many modifications may be made in the details of the process without departing from the scope of this disclosure. It is understood that the compositions and methods are not limited to the embodiments set forth herein for purposes of exemplification.

In various embodiment of the present invention, an improved loss control composition and process of preparing the loss control composition is provided.

Figure 1A:
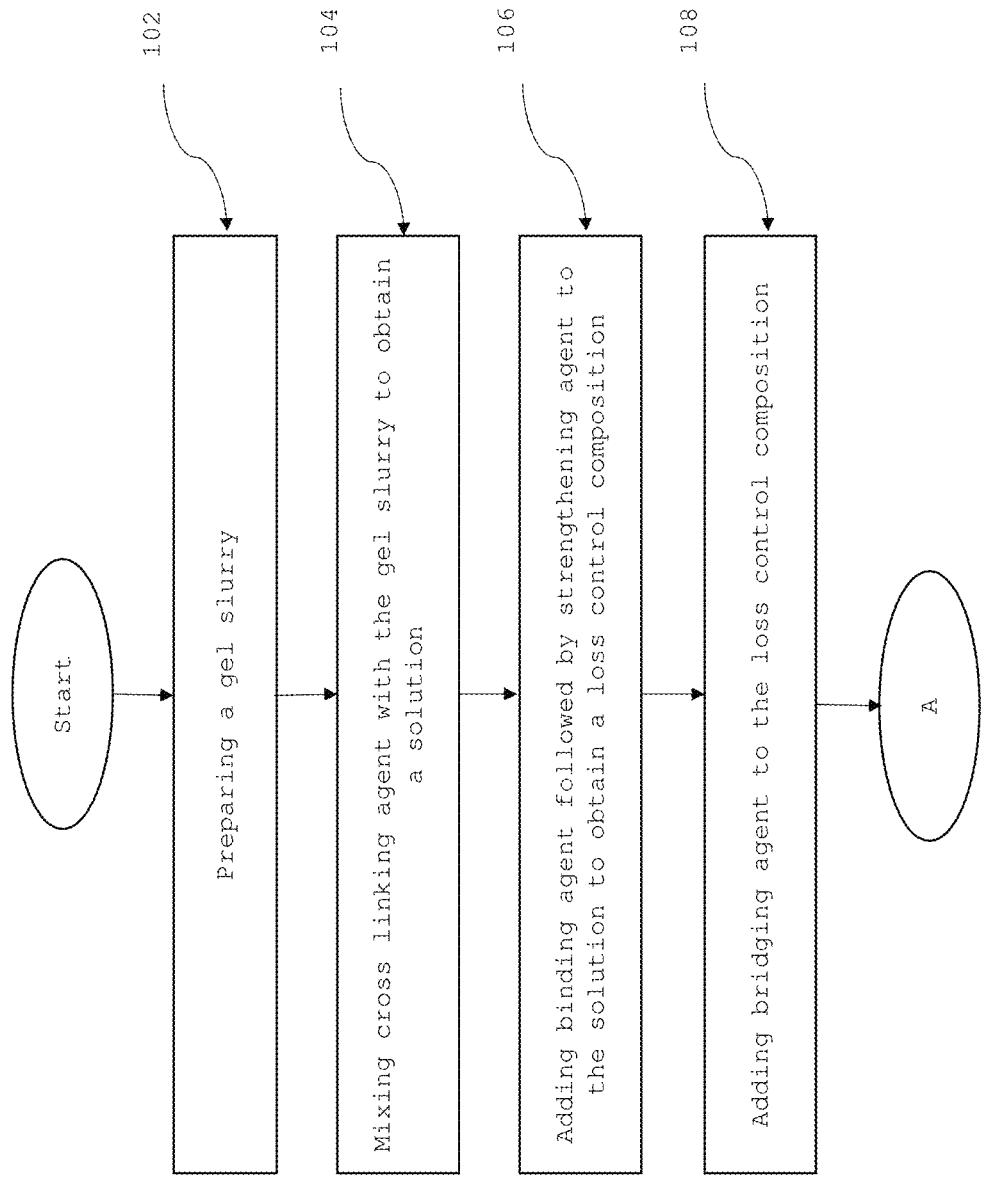
FIG. 1A and FIG. 1B is a flow chart illustrating a process for preparation of the improved loss control composition, in accordance with an embodiment of the present invention.
Figure 1B:
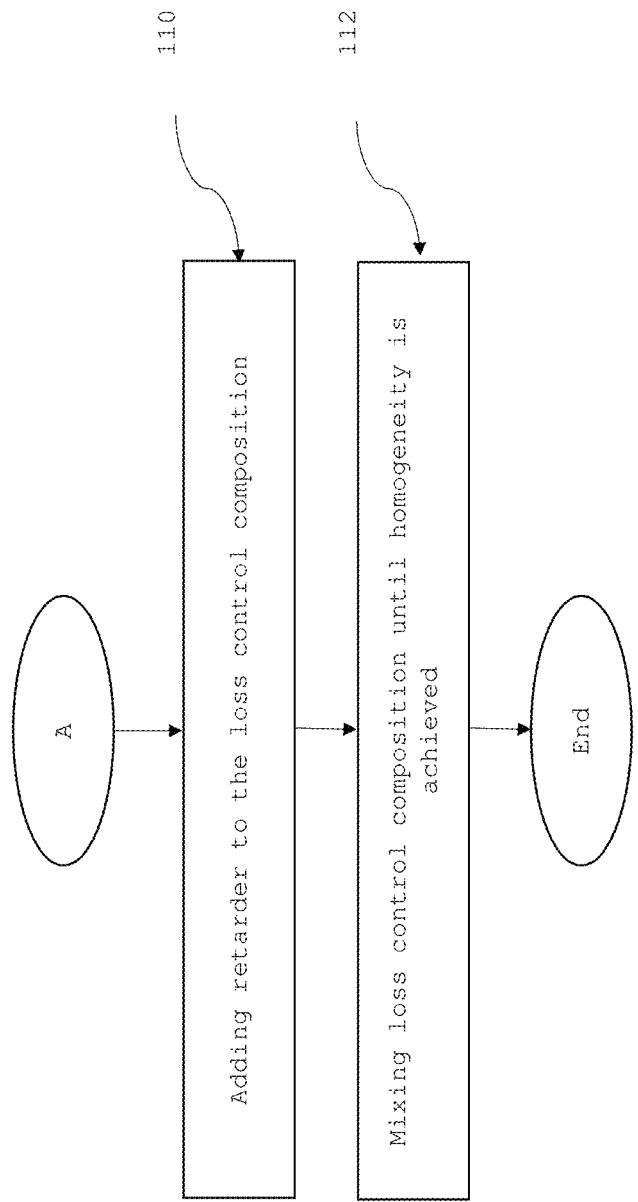

FIGS. 1A and 1B is a flow chart illustrating a process for preparation of loss control composition, in accordance with an embodiment of the present invention.

At step 102, a gel slurry is prepared. In an exemplary embodiment of the present invention, the gel slurry comprises bentonite and water. The bentonite is an active ingredient of the gel slurry that is allowed to hydrate for a predefined time duration. In an exemplary embodiment of the present invention, the hydrated bentonite forms 4-6 parts of the gel slurry by weight. In an embodiment of the present invention, the gel slurry is mixed in a waring blender in a predetermined amount. In another exemplary embodiment of the present invention, the pre-defined time period is a minimum time duration of 30 minutes. In another exemplary embodiment of the present invention, the gel slurry comprises montmorillonite clay. In another exemplary embodiment of the present invention, the bentonite comprises other commercial clays. Advantageously, in an embodiment of the present invention, the montmorillonite clay helps in reducing density of the gel slurry. In an embodiment of the present invention, the loss control composition is a lightweight thixotropic composition that is prepared in a density range of 10 Pounds Per Gallon (ppg) to 16 ppg.

At step 104, a cross linking agent is mixed with the gel slurry. In an embodiment of the present invention, the cross linking agent is a cross linking polymer which is added to the gel slurry and the solution comprising the cross linking polymer and gel slurry is mixed thoroughly for a predefined time duration. In an exemplary embodiment of the present invention, the pre-defined time duration is 5 minutes. In an exemplary embodiment of the present invention, the cross linking polymer is produced by a bacteria viz. *Xanthomonas campestris* that produces a gum during its normal life cycle via an enzymatic process. In another exemplary embodiment of the present invention, the cross linking polymer is diutan gum, welan gum, guar gum or any other available biopolymer.

At step 106, a binding agent is added to the solution comprising cross linking agent and gel slurry followed by adding a strengthening agent. In an exemplary embodiment of the present invention, the binding agent used in the solution is magnesium sulphate which is used in a ratio of 14-40 parts with respect to the solution. In another exemplary embodiment of the present invention, the strengthening agent is in form of a Dead Burnt Magnesite (DBM). DBM is in the form of magnesium oxide which is calcined to high temperatures of up to 1700° C. and has a very low reactivity which provides sufficient time for pumping of the loss composition solution in an offshore oil well. In an embodiment of the present invention, the strengthening agent is added to the binding agent and the binding agent reacts with the strengthening agent.

At step 108, a bridging agent is added to the solution comprising binding agent, cross linking agent, gel slurry and strengthening agent. In an embodiment of the present invention, a bridging agent in the form of Micronized Calcium Carbonate (MCC) may be added depending on the loss circulation conditions in the offshore oil well.

At step 110, a retarder may be added to the solution comprising bridging agent, binding agent, cross linking agent, gel slurry and strengthening agent to obtain the loss control composition. In an embodiment of the present invention, the retarder may be added depending upon bottom hole circulating temperature. The retarder may be used to slow down chemical reaction of the loss control composition inside an offshore oil well. In an exemplary embodiment of the present invention, the strengthening agent is in a ratio of 28-80 parts with respect to the loss control composition.

At step 112, the loss control composition is mixed until the loss control composition becomes homogenous. In an embodiment of the present invention, the loss control composition is mixed at 4,000 rev/min until the loss control composition becomes homogenous. After a 10-minute static period, the loss control composition becomes unpumpable. After mixing with a spatula for a minute thoroughly and briskly, the loss control composition reversibly becomes pumpable (fluid) that exhibits thixotropic nature of the loss control composition. In various embodiments of the present invention, the mixing may be carried out in a mixing device.

Table 1, Table 2, Table 3 below illustrates experimental data of various quantities of gel slurry, binding agent, strengthening agent, bridging agent and cross linking agent used at below mentioned temperature, pressure, and Raising Time (RT) in various exemplary embodiments of the present invention. From the experimental data it is observed that loss control composition provides cementitious property without using cement and develops rapid static gel strength. The loss control composition exhibits a low initial viscosity at surface of the oil well, and viscosity of the loss control composition increases as the temperature increases inside the oil well. Further, the loss control composition exhibits the thixotropic behavior because it is viscous under static condition and once dynamic condition is attained, the material viscosity of the loss control composition starts decreasing because of its shear thinning property. The shear thinning property is represented by decreasing viscosity with increasing shear rate, and such behavior provides many benefits such as placing the loss control composition easily downhole, preventing gas migration, and reducing flow of the loss control composition to thief zones before solidification of the loss control composition.

The loss control composition also provides high resistance to contaminations occurring due to water, gas and drilling fluid. The loss control composition achieves enough compressive strength around 50 Pound Per Square Inch (PSI) in 2 hrs and 100 PSI in 5 hrs that prevents washout in the oil well while resuming operations after mud loss inside the oil well. Further, the loss control composition is acid soluble in 15% Hydrochloric Acid (HCL) unlike conventional cementitious compositions and therefore loss control composition causes no damage to reservoir sections in the oil well. In an embodiment of the present invention, 94-96% of the loss control composition is soluble in 15 percent hydrochloric acid (HCL).

TABLE 1

Temperature: 50-70° C., Pressure: 3000 psi,
Raising Time (RT): 30 Min, Specific Gravity (SG) (1.37)

| SG | Gel Slurry | Binding Agent | Strengthening Agent | Bridging Agent | Crosslinking Agent | Initial Consistency (BC) | Thickening Time (Min) |
|---|---|---|---|---|---|---|---|
| 1.37 | 100 | 20 | 40 | 07 | 0.6 | 34 | 392 @50° c. |
| 1.37 | 100 | 20 | 40 | 07 | 0.4 | 11 | 170 @60° c. |
| 1.37 | 100 | 20 | 40 | 07 | 0.4 | 27 | 126 @70° c. |

TABLE 2

Temperature: 80° C., Pressure: 3000-8000 psi, RT: 40 Min, Specific Gravity (SG) 1.20-1.40

| SG | Gel Slurry | Binding Agent | Strengthening Agent | Bridging Agent | Crosslinking agent | Initial Consistency | BHP (PSI) | Thickening Time (Mins) |
|---|---|---|---|---|---|---|---|---|
| 1.20 | 100 | 14 | 28 | — | 0.4 | 5 | 3000 | 110 |
| 1.27 | 150 | 20 | 40 | — | 0.5 | 22 | 5000 | 220 |
| 1.33 | 125 | 20 | 40 | 07 | 0.5 | 22 | 5000 | 151 |

In the Table 2 as shown above, the thickening time for loss control composition increased from 110 minutes to 220 minutes by increasing proportion of gel slurry to 150 parts by weight, binding agent to 20 parts by weight, strengthening agent to 40 parts by weight, cross linking agent to 0.5 parts by weight of the loss control composition at a pressure of 5000 psi. The increase in thickening time results in the thixotropic property. In another embodiment of the present invention, the loss control composition may be prepared from a range of 10 ppg to 16 ppg. Further, the loss control composition may operate at Bottom Hole Circulating Temperature (BHCT) of 500 C to 1500 C and at Bottom Hole Pressure (BHP) of 3000-10000 PSI. In an embodiment of the present invention, the 10 ppg lightweight loss control composition is easier to pump that prevents further formation breakdown due to excessive hydrostatic head. In an exemplary embodiment of the present invention, a 12 ppg formulation controlled dynamic losses from 150 bbl/hr to NIL.

TABLE 3

Temperature: 90° C., Pressure: 5000 Psi, RT: 40 Min

| SG | Gel Slurry | Binding Agent | Strengthening Agent | Bridging Agent | Crosslinking agent | Initial Consistency | Thickening Time (Min) |
|---|---|---|---|---|---|---|---|
| 1.29 | 150 | 20 | 40 | 05 | 0.4 | 18 | 165 |

Test Results Obtained Prior to Field Implementation of Slurry

Table 4 below illustrates experimental data of the test results obtained prior to field implementation of the loss control composition.

TABLE 4

Temperature: 75° C., Pressure: 3000 Psi, RT: 30 Min, Motor Break of 45 mins after 60 mins to simulate actual field operations

| SG | Gel Slurry | Binding Agent | Strengthening Agent | Retarder | Crosslinking agent | Initial Consistency | Thickening Time (Min) |
|---|---|---|---|---|---|---|---|
| 1.30 | 100 | 20 | 40 | 0.4 | 0.4 | 18 | 227 |

The compressive strength is obtained in 24 hrs @100° C., 244 psi and the $Gel_0/Gel_{10}$ is 25/41. Table 5 below illustrates the average dial reading at different values of RPM at BHCT.

TABLE 5

| RPM | 3 | 6 | 30 | 60 | 100 | 200 | 300 |
|---|---|---|---|---|---|---|---|
| Average Dial Reading | 24 | 28 | 37 | 41 | 49 | 61 | 71 |

Test Results if Hesitation Squeeze Method is Followed

Hesitation squeeze method involves intermittent application of pressure—by pumping at a rate of ¼ to ½ bbl/min—separated by an interval of 10 to 20 min for pressure falloff caused by filtrate loss to the formation inside the oil well. In the hesitation squeeze method, pause interval and pumping schedule depends on loss rate and thixotropy of the loss control composition. During the pause interval, the loss control composition gains gel strength that helps in curing of the losses inside the oil well. Further, the subsequent pumping of small volume of the loss control composition and pause interval helps in curing the losses. Furthermore, the hesitation squeeze method illustrates the thixotropic properties of the loss control composition.

Test Results in Terms of Thickening Time of the Loss Control Composition

Table 5.1, Table 6, Table 7 and Table 7.1 and the below mentioned tables illustrate test results in terms of thickening time of the loss control composition.

TABLE 5.1

Temperature 85° C., Pressure: 2500 psi, RT: 35 mins, SG 1.60

| SG | Gel Slurry | Binding Agent | Strengthening Agent | Retarder | Initial Consistency | Thickening Time (Min) |
|---|---|---|---|---|---|---|
| 1.60 | 100 | 40 | 80 | 10 | 18 | 227 |

TABLE 6

Temperature 120° C., Pressure: 8000 psi, RT: 60 mins SG 1.23

| SG | Gel Slurry | Binding Agent | Strengthening Agent | Crosslinking Agent | Retarder | Initial Consistency | Thickening Time (Min) |
|---|---|---|---|---|---|---|---|
| 1.23 | 150 | 20 | 40 | 0.5 | 10 | 14 | 278 |

TABLE 7

Temperature 150° C., Pressure: 10000 psi, RT: 60 mins SG 1.23

| SG | Gel Slurry | Binding Agent | Strengthening Agent | Crosslinking agent | Retarder | Initial Consistency | Thickening TIME (Min) |
|---|---|---|---|---|---|---|---|
| 1.23 | 150 | 20 | 40 | 0.5 | 10 | 13 | 153 |

The test conditions for testing the loss control composition is provided below:

| | |
|---|---|
| Temperature | BHCT-85° C. |
| Pressure | 3100 PSI |
| Raising Time | 62 Minute |
| Break Schedule | As per Table 8 as shown below |

Further, composition in grams of the loss control composition is illustrated in the below table:

TABLE 7.1

| Water | Bentonite | Crosslinking Agent | Binding Agent | Strengthening Agent |
|---|---|---|---|---|
| 100 | 5 | 0.4 | 20 | 40 |

Table 8 and Table 9 illustrate displacement, pumping and break timing required for the loss control composition.

TABLE 8

| Schedule | Time in minute |
|---|---|
| Displacement | 62 |
| Pump | 62-72 |
| Break | 72-82 |
| Pump | 82-87 |
| Break | 87-97 |
| Pump | 97-102 |
| Break | 102-112 |
| Pump | 112-117 |
| Break | 117-127 |
| Pump | 127-132 |
| Break | 132-142 |
| Pump | 142-147 |
| Break | 147-167 |
| Pump | 167-173 |
| Break | 173-203 |
| WOP | — |

TABLE 9

| Schedule | Time in minute | Results in BC |
|---|---|---|
| Displacement | 62 | |
| Pump | 62-72 | |
| 1$^{st}$ Break | 72-82 | Hump upto 41 BC |
| Pump | 82-87 | 22 |
| 2$^{nd}$ Break | 87-97 | Hump upto 32 BC |
| Pump | 97-102 | 23 |
| 3$^{rd}$ Break | 102-112 | Hump upto 41 BC |
| Pump | 112-117 | 23 |
| 4$^{th}$ Break (Safety Pull out) | 117-127 | Hump upto 42 BC |
| Pump | 127-132 | 26 |
| 5$^{th}$ Break | 132-142 | Hump upto 41 BC |
| Pump | 142-147 | 29 |

TABLE 9-continued

| Schedule | Time in minute | Results in BC |
| --- | --- | --- |
| 6$^{th}$ Break | 147-167 | Hump upto 42 BC |
| Pump | 167-173 | 29 |
| 7$^{th}$ Break | 173-203 | Hump upto 46 BC and thereafter set |
| Thickening time | 203 | |

In an embodiment of the present invention, the loss control composition is prepared at an oil well rig by the following steps:

Step 1: Cleaning the slug tanks/pit/batch mixer and mixing lines flushing with drill water. Ensuring agitator rotation as per preparation requirement.

Step 2: Taking required quantity of technical water (Salinity<500 ppm) and adding required quantity of bentonite through hopper. After preparation, stopping agitator for hydration time of at least 30 mins.

Step 3: Adding mixed metal oxide through hopper and mixing it thoroughly.

Step 4: Adding XCP through hopper slowly, mixing it thoroughly and leaving solution idle for 10-15 minutes.

Step 5: Adding Magnesium Sulphate (MgSO$_4$) through hopper, mixing it thoroughly followed by adding DBM.

Figure 9:
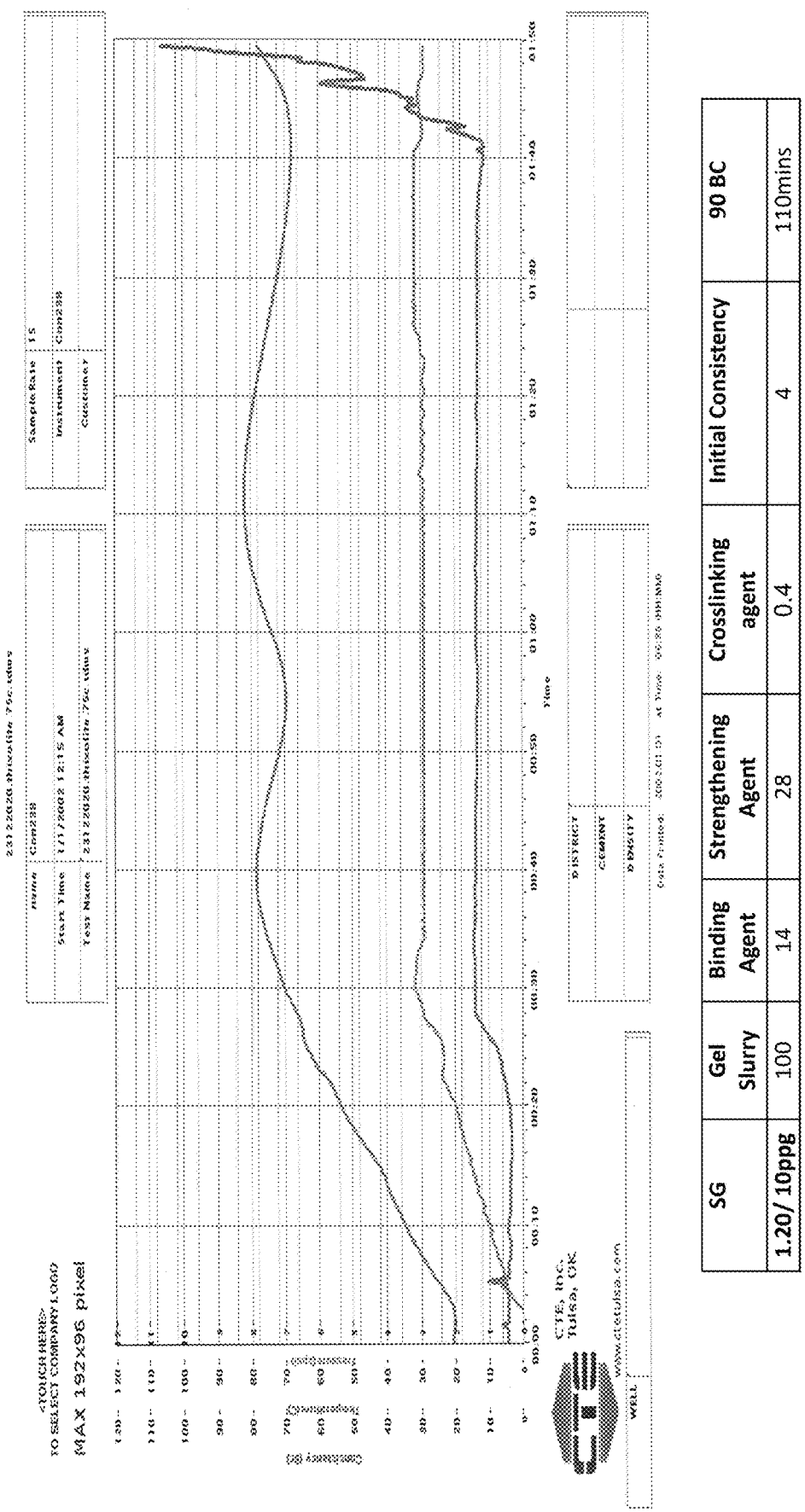
FIG. 9 is a graph illustrating thixotropic effect of the loss control composition, in accordance with an embodiment of the present invention.

FIG. 2 illustrates thickening time graph of the loss control composition at a temperature of 80° Celsius and a pressure of 5000 psi. FIG. 3 illustrates thickening time graph of the loss control composition at a temperature of 120° Celsius and a pressure of 8000 PSI. FIG. 4 illustrates thickening time graph of the loss control composition at a temperature of 150° Celsius and a pressure of 10000 PSI. FIG. 5 illustrates thixotropic properties of the loss control composition at a temperature of 150° Celsius and a pressure of 10000 PSI. FIG. 6 illustrates compressive strength graph of the loss control composition at a pressure of 100 psi in 5 hrs and 50 psi in 2 hrs at a bottom hole temperature of 1000° C. and a bottom hole pressure of 3000 psi raised in 4 hrs. FIG. 7 illustrates thickening time graph of the loss control composition at a temperature of 90° Celsius and a pressure of 5000 psi. FIG. 8 illustrates hesitation squeeze at BHCT-85° C., BHP-3000 psi and RT-60 mins. FIG. 9 illustrates thixotropy effect of the loss control composition at a temperature of 85° Celsius and a pressure of 3000 psi. FIG. 10 illustrates Static Gel Strength (SGS) build up from 100 SGS to 500 SGS in 12 minutes, reflecting rapid build-up of static gel strength.

In an exemplary embodiment of the present invention, the graph as illustrated in FIG. 2 is generated by a HPHT consistometer machine. The thickening time is time elapsed from initial application of temperature and pressure to the time required for the loss control composition to reach a consistency of 100 Bc. Conventionally, the thickening time graph provides an idea of placement time that is controlled by a cementing engineer and the graph provides an exact estimate of time as of how long the cement remains pumpable. Advantageously, in an embodiment of the present invention, the thickening time graph provides an estimated time when the loss control composition becomes unpumpable and also provides an estimated time by when the loss circulation has been completely cured inside the oil well. Advantageously, in an embodiment of the present invention, the loss control composition is easily pumpable through drill bit and when pumping is stopped it gives thixotropic properties which is helpful in controlling losses. Further, the loss control composition provides a predictable and controllable pumping time, ranging from a few minutes to several hours at a given temperature. This is an important advantage of the loss control composition as it allows the formulation of the loss control composition to remain pumpable for sufficient time for placement that helps in developing a network structure that leads to gelation over a predictable period of time.

In an embodiment of the present invention, the loss control composition is acid soluble in 15% acid which provides quick, reliable control of loss circulation in offshore oil well. In an embodiment of the present invention, the following procedure is used for measuring acid solubility.

1. Curing loss control composition specimen in HPHT curing Chamber
2. Place it on beaker on the atmospheric consistometer of the specimen at designed BHCT;
3. Removing the specimen from the water, blot drying, weighing and placing it on the support stand.
4. Preparing 15% HCl acid solution for testing; pouring it into the beaker where cured loss control composition is placed.
5. Note down the timing as soon as the acid solution is poured over the 1 cc and additionally heat the composition at designed BHCT.
6. After a particular lapse of time in hours the loss control composition becomes completely acid soluble, filter it and note the amount till insoluble.
7. Calculating the solubility with the following equation:

$$S\% = 100 \times (1 - Wt \div Wi)$$

where S % is solubility in percent, Wt is sample weight at time, and Wi is initial specimen weight.

Advantageously, in various embodiments of the present invention, the loss control composition has a low initial viscosity that allows the loss control composition to flow easily, and, further the loss control composition becomes gelled near wellbore to form a permanent sealant. In another embodiment of the present invention, the loss control composition develops a nominal compressive strength that helps it to adhere to the formation of the offshore oil well and also prevents it from getting displaced in subsequent well operations. Consequently, severe circulation losses that result from large fractures or vugular spaces are controlled.

Further, advantageously, in various embodiments of the present invention, the loss control composition has a very low viscosity under applied shear and hence it flows easily into loss zones inside the oil well. Further, a decreasing shear rate is encountered when the loss control composition flows inside the loss zone, causing a rapid development of gel strength. The rapid buildup of static gel strength along with marginal compressive strength development of 200 psi of the loss control composition helps plug loss zones and mitigate loss circulation. Marginal compressive strength development helps the loss control composition to adhere to the formation of the offshore oil well by forming a weak bond that helps in preventing displacement during subsequent well operations. Yet further, the loss control composition takes a liquid form for a few cycles after shear force is applied and therefore becomes less viscous during mixing and displacement. Subsequently, viscosity of the loss control composition increases as the shear rate is reduced that helps to avoid recurrent losses when the drilling process restarts in the offshore oil well.

Furthermore, advantageously, in various embodiments of the present invention, the loss control composition has a low initial viscosity at surface of the offshore oil well. The viscosity of the loss control composition increases as the temperature increases inside the offshore oil well. Further, the low initial viscosity of the loss control composition aids in pumping loss control composition easily. Further, the loss control composition exhibits a thixotropic behavior as it is viscous under static condition and once dynamic condition is attained, the viscosity of the loss control composition starts decreasing because of shear thinning property. The shear thinning property is represented by decreasing viscosity with increasing shear rate, and this property provides advantages such as placing the loss control composition downhole easily, preventing gas migration, and reducing flow of loss control composition to loss zones inside the offshore oil well before solidification of the loss control composition. Further, the loss control composition provides a predictable and controllable pumping time, ranging from a few minutes to several hours at a given temperature that allows the loss control composition to remain pumpable for sufficient time for placement that also develops the network structure that leads to gelation, over a predictable period of time.

Yet further, advantageously, in accordance with various embodiments of the present invention, the loss control composition is self-supporting and is used for plugging loss circulation zone. The loss control composition takes a liquid form for a few cycles after shear is applied providing less viscosity during mixing and displacement in the offshore oil field. Subsequently, viscosity of the loss control composition increases as the shear rate is reduced helping avoid recurrent losses when drilling process restarts in the offshore drilling well. In an exemplary embodiment of the present invention, the loss control composition develops a compressive strength of 100 Psi in 5 hrs and 50 Psi in 2 hrs as illustrated in FIG. 3 which is sufficient to stop lost circulation. In an exemplary embodiment of the present invention, a static gel analyzer test conducted on the loss control composition shows rapid buildup of the static gel strength of the loss control composition.

In an embodiment of the present invention, Static Gel Strength Analyzer (SGSA) test shows build up from 100 SGS to 500 SGS in 12 minutes, reflecting rapid build-up of static gel strength of the loss control composition. SGSA is measured using MACS II device that performs static gel strength tests on loss control composition slurry samples to analyze the gas-tight property of loss control composition slurry during transition phase. MACS II conducts these tests under simulated down-hole pressure and temperature conditions to determine the transition time of the loss control composition. The loss control composition slurry being tested is maintained in a static condition in a pressure chamber at a controlled temperature and pressure. The SGS is calculated from the torque required to rotate a paddle of known geometry intermittently at very low speed. Transition time is defined as time required for the loss control composition slurry to transition from 100 SGS to 500 SGS. Conventionally, a cement slurry at a SGS of 100 lbf/100 ft² loses its ability to fully transmit hydrostatic pressure due to gel strength development. Further, during this gelling stage, gas migration can occur. However, at 500 lbf/100 ft², the hydrostatic pressure is still decreased but the loss control composition slurry is solid enough to hold its weight and gas migration through the oil well ceases. Further, for gas migration prevention in the oil well, transition time may be as short as possible and should be less than 30 mins. In an exemplary embodiment of the present invention, a good transition time is considered to be 30 minutes or less.

In various embodiments of the present invention, advantageously, the loss control composition controls partial and total losses both under static and dynamic conditions and may be used in vertical, deviated as well as in horizontal offshore oil wells. Further, the loss control composition does not have any detrimental effect on producing formation and on productivity and life of the offshore oil well and thereby it is economically viable. Further, the loss control composition is simple, easily applicable, and without any major modification in the offshore oil field. In an embodiment of the present invention, the gel slurry is applicable to the offshore oil fields up to a depth of 4000 m where the reservoir temperature ranges between 60° C. to 150° C. The loss control composition has a low initial viscosity at the surface when shearing force is applied, and the viscosity increases as the temperature increases.

Table 10 illustrates experimental data associated with constituents of the loss control composition for measuring shear rate and shear stress of the loss control composition as shown in Table 11 below, in accordance with an embodiment of the present invention.

TABLE 10

| Specific Gravity (SG)/PPG | Gel Slurry | Binding Agent | Strengthening Agent | Bridging Agent | Crosslinking Agent | Initial Consistency |
|---|---|---|---|---|---|---|
| 1.33/11.1 | 100 | 20 | 40 | 05 | 0.25 | 18 |

TABLE 11

| S. No. | Shear Rate (RPM) | Shear Stress(lbs/100 ft²) |
|---|---|---|
| 1. | 3 | 36 |
| 2. | 6 | 39 |
| 3. | 30 | 52 |
| 4. | 60 | 65 |
| 5. | 100 | 79 |
| 6. | 200 | 106 |
| 7. | 300 | 126 |
| 8. | 600 | 175 |

Further, the $Gel_0/Gel_{10}$ is 41/64 lbs/100 ft², Plastic Viscosity/Yield Point (PV/YP) is 82 cps/48.01 lbs/100 ft² and n'/k' is 0.61/1.1 of the loss control composition. Plastic viscosity (PV) is a measure of flow resistance that is caused by mechanical friction. In an example, lower value of PV signifies lower concentration of solids used for preparation of thixolite. Further, the Yield Point (YP) signifies electro-chemical or attractive forces present in the loss control composition. These forces are as a result of negative and positive charges located on or near the particle surface of the loss control composition, that on turn depends on quantity and concentration of chemicals added to prepare the loss control composition.

Gel strength is a measure of attractive forces between particles in a fluid under static conditions. $Gel_0/Gel_{10}$ values indicate the degree of gelation of the loss control composition. Further, the $Gel_0$ value indicates how quickly without shear the loss control composition is converted into gel and further stops losses from occurring within 10 seconds. In an embodiment of the present invention, for measuring $Gel_0$, a viscometer is used that is turned off for 10 sec after which the rotational speed is set to be equivalent to 5.1 $sec^{-1}$ (3 rpm) and the highest dial reading is measured. Similarly, $Gel_{10}$ values indicates degree of gelation after 10 mins when the LCC is kept idle for 10 minutes. Further, 'n' indicates degree of thixotropic or degree of shear thinning, lower the value of 'n', better the shear thinning property, it is a dimensionless number. Whereas 'k' indicates an apparent viscosity of the lost control composition.

In another embodiment of the present invention, compatibility of loss control composition with different types of Water Based Mud (wbm) and Non-Damaging Drilling Fluid (NDDF) is measured. Tables 12 and 13 below illustrate that the loss control composition has a positive R-index value that indicates compatibility of the loss control composition with NDDF & similarly with other water based muds. The R-index value indicates rheological compatibility of fluids (cement: spacer and mud: spacer) where the R-index value is calculated as below:

R index (R)=[Highest 100 RPM reading from a mixture-Highest 100 RPM reading from an individual fluid]. Table 12 below illustrates compatibility of fluids with different range of R values.

TABLE 12

| If R < 0 | Fluids are compatible. |
|---|---|
| R is more than zero & lessthan 40 | Fluids are compatible, but friction pressures should be verified to avoid fracturing the formation. |
| R is more than 41 & less than 70 | Fluids are slightly incompatible. Additional testing is required. |
| R > 70 | Definitely Incompatible. An alternative formulation must be re-designed. |

R-Index as illustrated in the tables 13, 14 and 15 provides quantification on degree of compatibility between loss control composition and spacer and compatibility between loss control composition and mud. In most of the cases while drilling we encounter losses, that results in loss of drilling fluid. During this stage only we need to pump loss control solutions, while pumping this loss control formulation it will come in contact with drilling fluid that may be NDDF/SOBM or any other Water base mud (WBM)/Low Toxic Synthetic Oil Based Mud (LTSOBM) that is used in the well and it may form an unpumpable mass i.e. show signs of incompatibility. It is now pertinent that the mixture of lost control solution when comes in contact with spacer which acts as a buffer fluid doesn't form a viscous mass, or shows phase separation or settling or flocculation etc.

TABLE 13

| Loss circulation composition | Rheometer dial readings @ 80° C. | | | | | | | R-Index | |
|---|---|---|---|---|---|---|---|---|---|
| (LCC) mixture | 300 | 200 | 100 | 60 | 30 | 6 | 3 | Value | Remarks |
| 100% LCC 11 PPG | 126 | 106 | 79 | 65 | 52 | 39 | 36 | | Compatible |
| 100% NDDF 9.6 PPG | 36 | 30 | 20 | 16 | 12 | 5 | 3 | | |
| 95% LCC:5% NDDF | 119 | 99 | 74 | 68 | 45 | 31 | 29 | +10 | Compatible |
| 75% LCC:25% NDDF | 128 | 109 | 89 | 75 | 66 | 51 | 48 | | |
| 50% LCC:50% NDDF | 97 | 79 | 61 | 53 | 46 | 32 | 29 | | |
| 25% Lcc:75% NDDF | 57 | 48 | 36 | 30 | 24 | 14 | 11 | | |
| 5% Lcc:9 5% NDDF | 38 | 32 | 24 | 19 | 16 | 8 | 6 | | |

TABLE 14

| LCC | Rheometer dial readings @ 80° C. | | | | | | | R-Index | |
|---|---|---|---|---|---|---|---|---|---|
| Mixture | 300 | 200 | 100 | 60 | 30 | 6 | 3 | Value | Remarks |
| 100% LCC 11 PPG | 126 | 106 | 79 | 65 | 52 | 39 | 36 | | — |
| 100% NDDF 9.6 PPG | 45 | 37 | 25 | 21 | 17 | 12 | 9 | | — |
| 95% LCC:5% NDDF | 119 | 99 | 74 | 68 | 45 | 31 | 29 | +29 | Compatible No viscous mass observed |
| 75% LCC:25% NDDF | 180 | 149 | 108 | 86 | 70 | 49 | 43 | | |
| 50% LCC:50% NDDF | 125 | 102 | 75 | 61 | 49 | 34 | 30 | | |
| 25% LCC:75% NDDF | 66 | 53 | 39 | 31 | 25 | 17 | 15 | | |
| 5% LCC:95% NDDF | 51 | 433 | 31 | 27 | 19 | 15 | 11 | | |

In another embodiment of the present invention, compatibility of loss control composition with spacer is measured. The spacer is used such that there is no contamination or compatibility issues between mud and the loss control composition. Table 14 below illustrates that the loss control composition has a positive R-index value within the limit specified that indicates compatibility of the loss control composition with the spacer. Further, compatibility studies of the loss control composition are carried out with various available spacers and drilling fluid that are used to drill oil and gas wells.

Table 15 below illustrates rheological compatibility studies of loss control composition of 10 ppg with B250 spacer at 80° C.

TABLE 15

| LCC Mixture | Rheometer dial readings @ 80° C. | | | | | | | R-Index Value | Remarks |
|---|---|---|---|---|---|---|---|---|---|
| | 300 | 200 | 100 | 60 | 30 | 6 | 3 | | |
| 100% Spacer (3% B250) Sp. gr-1.15 | 58 | 52 | 43 | 39 | 34 | 26 | 23 | — | |
| 100% LCC, sp. gr-10 PPG | 126 | 106 | 79 | 65 | 52 | 39 | 36 | — | |
| 95% Spacer:5% LCC | 61 | 54 | 46 | 41 | 36 | 28 | 25 | +0 | Compatible |
| 75% Spacer:25% LCC | 74 | 65 | 55 | 50 | 39 | 31 | 28 | | |
| 50% Spacer:50% LCC | 94 | 78 | 65 | 62 | 43 | 33 | 30 | | |
| 25% Spacer:75% LCC | 111 | 96 | 79 | 84 | 51 | 39 | 35 | | |
| 5% Spacer:95% LCC | 121 | 102 | 76 | 81 | 48 | 37 | 34 | | |

Table 16 below illustrates rheological compatibility studies of the loss control composition with D182 spacer at 80° C.

TABLE 16

| Fluid Mixture | Rheometer dial readings @ 80° C. | | | | | | | R-Index Value | Remarks |
|---|---|---|---|---|---|---|---|---|---|
| | 300 | 200 | 100 | 60 | 30 | 6 | 3 | | |
| 100% Spacer (3% D182) Sp. gr-1.30 | 55 | 49 | 40 | 35 | 29 | 21 | 16 | — | |
| 100% LCC, sp. gr-11.1 PPG | 126 | 106 | 79 | 65 | 52 | 39 | 36 | — | |
| 95% Spacer:5% LCC | 59 | 52 | 43 | 38 | 31 | 24 | 18 | +1 | Compatible |
| 75% Spacer:25% LCC | 70 | 61 | 51 | 45 | 36 | 27 | 23 | | |
| 50% Spacer:50% LCC | 81 | 78 | 60 | 51 | 41 | 31 | 27 | | |
| 25% Spacer:75% LCC | 102 | 91 | 80 | 56 | 45 | 34 | 30 | | |
| 5% Spacer:95% LCC | 121 | 101 | 74 | 62 | 49 | 36 | 34 | | |

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A method for preparing a non-cementitious loss control composition, wherein non-cementitious means without cement, the method comprising:
   adding bentonite to water to form a gel slurry;
   adding a cross linking agent to the gel slurry, wherein the cross linking agent is a cross linking polymer selected from a group consisting of welan gum, guar gum and diutan gum;
   adding a binding agent to the gel slurry and the cross linking agent, wherein the binding agent is magnesium sulphate;
   adding a strengthening agent to the binding agent, the gel slurry and the cross linking agent, wherein the strengthening agent is dead burnt magnesite;
   adding a bridging agent to the strengthening agent, the binding agent, the gel slurry and the cross linking agent; and
   stirring the bridging agent, the strengthening agent, the binding agent, the gel slurry, and the cross-linking agent at 4000 rpm to obtain a homogeneous loss control composition, wherein the loss control composition is a lightweight thixotropic composition having a density range of 10 pounds per gallon (ppg) to 16 ppg.

2. The method as claimed in claim 1, wherein the bentonite forms 4-6 parts of the gel slurry by weight.

3. The method as claimed in claim 1, wherein the bentonite is added to water for 30 minutes to obtain the gel slurry.

4. The method as claimed in claim 1, wherein the binding agent is used in a ratio of 14-40 parts with respect to the loss control composition.

5. The method as claimed in claim 1, wherein the dead burnt magnesite is in the form of magnesium oxide that is calcined to a temperature of 1700° C. and has low reactivity that provides sufficient time for pumping of the loss control composition.

6. The method as claimed in claim 1, wherein the strengthening agent is in a ratio of 28-80 parts with respect to the loss control composition.

7. The method as claimed in claim 1, wherein the bridging agent is micronized calcium carbonate that is added to the loss control composition depending on the loss circulation conditions.

8. A non-cementitious loss control composition, wherein non-cementitious means without cement, comprising:
a gel slurry comprising of 4-6 parts of bentonite and water;
a cross linking agent, wherein the cross linking agent is a cross linking polymer selected from a group consisting of welan gum, guar gum and diutan gum;
a binding agent in a range of 14-40 parts with respect to the loss control composition, wherein the binding agent is magnesium sulphate;
a strengthening agent in a range of 28-80 parts with respect to the loss control composition, wherein the strengthening agent is dead burnt magnesite; and
a bridging agent;
wherein the non-cementitious loss control composition is a lightweight thixotropic composition having a density range of 10 pounds per gallon (ppg) to 16 ppg and is soluble in 15% hydrochloric acid.

9. The loss control composition as claimed in claim 8, wherein the bentonite is hydrated for 30 minutes.

10. The loss control composition as claimed in claim 8, wherein the dead burnt magnesite is in the form of magnesium oxide that is calcined to a temperature of 1700° C. and has a very low reactivity that provides sufficient time for pumping of the loss control composition.

11. The loss control composition as claimed in claim 8, wherein the bridging agent is micronized calcium carbonate.

12. The loss control composition as claimed in claim 8, wherein the loss control composition achieves compressive strength of around 50 pounds per square inch (psi) in 2 hours at 100 psi in 5 hours that prevents washout in an oil well while resuming operations after mud loss inside the oil well.

13. The loss control composition as claimed in claim 8, wherein the loss control composition operates between bottom hole static temperature of 50° C. to 150° C. and at a bottom hole pressure of 3000-10000 psi.

14. The loss control composition as claimed in claim 8, wherein a 12 ppg formulation controls dynamic losses from 150 Barrel per hour (bbl/hr) to nil.

15. The loss control composition as claimed in claim 8, wherein the gel slurry is 150 parts by weight of the loss control composition, the binding agent is 20 parts by weight of the loss control composition, the cross linking agent is 0.5 parts by weight of the loss control composition at a pressure of 5000 psi at specific gravity of 1.27 that increases thickening time of the loss control composition to 220 minutes.

16. The loss control composition as claimed in claim 8, wherein the compressive strength is obtained in 24 hrs at 100° C., at a pressure of 244 psi, and wherein $Gel_0/Gel_{10}$ value of the loss control composition is 25/41, the $Gel_0/Gel_{10}$ value indicates a degree of gelation of the loss control composition.

* * * * *